United States Patent [19]

Kvasnikoff et al.

[11] Patent Number: 5,202,107
[45] Date of Patent: Apr. 13, 1993

[54] PROCESS FOR IMPROVING THE SULPHUR YIELD OF A COMPLEX FOR THE PRODUCTION OF SULPHUR FOLLOWED BY A PURIFICATION UNIT

[75] Inventors: Georges Kvasnikoff, Pré Marca; André Philippe, Lotissement de la Trinité ; Robert Voirin, Lotissement des Cascades, all of France

[73] Assignee: Societe National Elf Aquitaine (Prod.), Courbevoie, France

[21] Appl. No.: 809,220

[22] Filed: Dec. 16, 1991

Related U.S. Application Data

[63] Continuation of Ser. No. 460,966, filed as PCT/FR89/00284, Jun. 6, 1989 abandoned

[30] Foreign Application Priority Data

Jun. 8, 1988 [FR] France .................................. 88 07649

[51] Int. Cl.[5] .............................................. C01B 17/04
[52] U.S. Cl. .................................. 423/574 R; 423/576
[58] Field of Search ...................... 423/574 R, 576

[56] References Cited

U.S. PATENT DOCUMENTS

| 4,035,474 | 7/1977 | Kunkel et al. | 423/574 R |
| 4,487,754 | 12/1984 | Reed | 423/574 R |
| 4,508,699 | 4/1985 | Schoofs | 423/574 R |
| 4,532,119 | 7/1985 | Dupin | 423/564 |
| 4,836,999 | 6/1989 | Reed et al. | 423/574 R |

FOREIGN PATENT DOCUMENTS

| 1340067 | 12/1973 | United Kingdom | 423/574 R |
| 2143224 | 2/1985 | United Kingdom | 423/574 R |

Primary Examiner—Jeffrey E. Russel
Attorney, Agent, or Firm—Burgess, Ryan & Wayne

[57] ABSTRACT

A process is provided for improving the sulphur yield of a sulphur production unit using an acid gas containing $H_2S$ and wherein said unit is comprised of a sulphur plant with a downstream purification unit. The $H_2S$ resulting from hydrolysis of COS and $CS_2$ is almost entirely recovered in the form of sulphur in the purification unit resulting in an improved sulphur output of the overall installation.

21 Claims, 1 Drawing Sheet

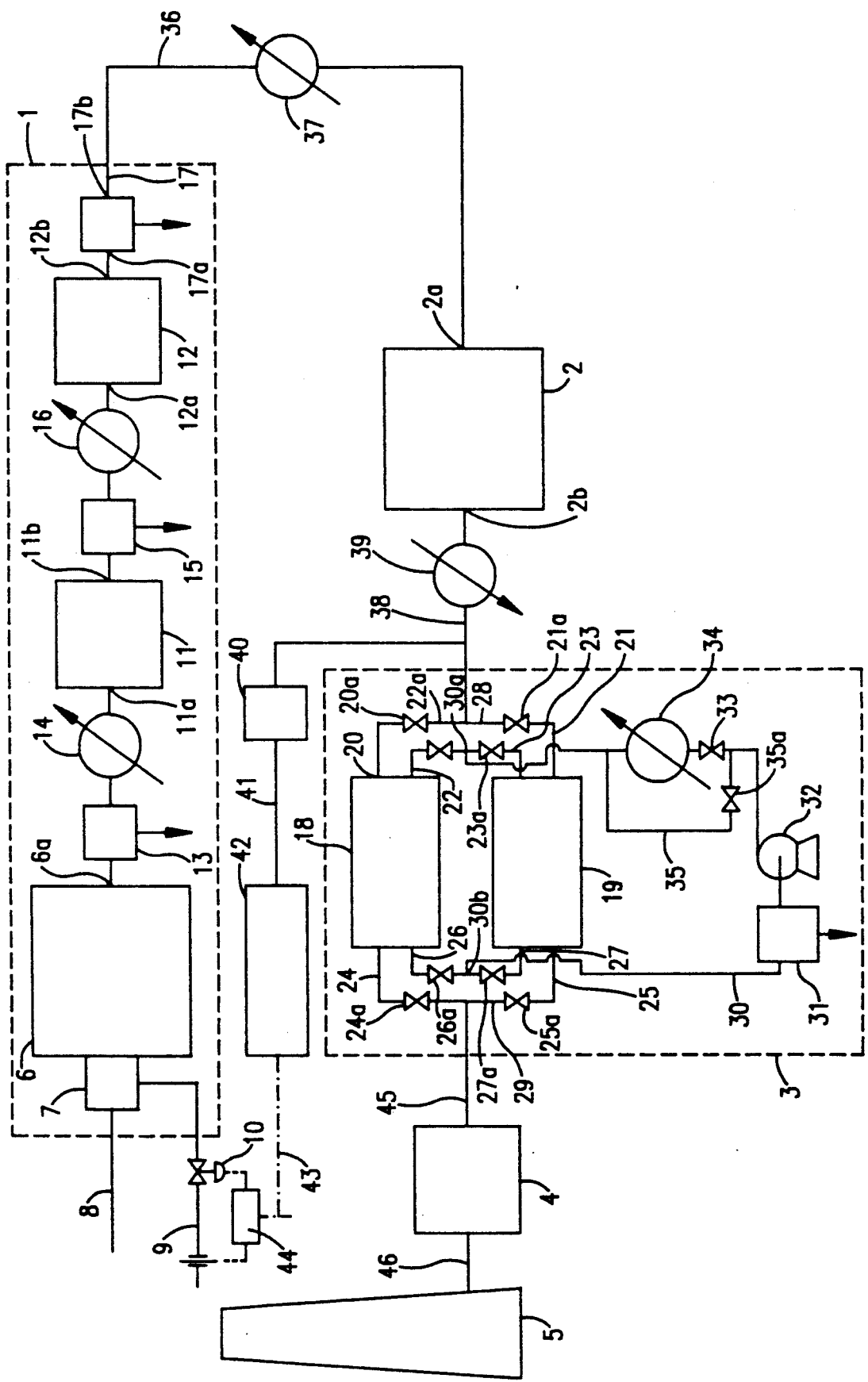

PROCESS FOR IMPROVING THE SULPHUR YIELD OF A COMPLEX FOR THE PRODUCTION OF SULPHUR FOLLOWED BY A PURIFICATION UNIT

This application is a continuation of application Ser. No. 460,966, filed as PCT/FR89/00284 filed Jun. 6, 1989 now abandoned.

BACKGROUND OF THE INVENTION

1. Field of the Invention

The invention relates to a process for improving the sulphur yield of a complex for the production of sulphur from an acid gas containing $H_2S$, said complex comprising a sulphur plant with a downstream a purification unit.

2. Description of the Related Art

The production of sulphur from an acid gas containing $H_2S$ is generally carried out in what is conventionally called a sulphur plant, i.e., in an installation into which said acid gas is introduced together with a controlled amount of a gas containing free oxygen, and in which a controlled oxidation of the $H_2S$ in the acid gas is carried out by means of the oxygen in the gas containing free oxygen in order to produce sulphur, and at the outlet of which a residual gas is withdrawn which contains water vapour and, in an overall amount of between 0.2 and 4% by volume, sulphur compounds including $H_2S$, $SO_2$ and sulphur vapour and/or vesicular sulphur. In most sulphur plants, controlled oxidation of the $H_2S$ in the acid gas is carried out in order to produce a gaseous effluent containing $H_2S$ and $SO_2$ and possibly elemental sulphur, and, after the sulphur which it may contain has been condensed out, said gaseous effluent is brought into contact with a CLAUS catalyst, situated in one or more catalytic oxidation zones operating at temperatures above the dew point of the sulphur contained in the effluent, in order to form a further amount of sulphur by the reaction of $H_2S$ with $SO_2$, said sulphur being condensed out. The sulphur compounds present in the residual gas coming from the sulphur plant frequently include at least one of the derivatives COS and $CS_2$ in addition to $H_2S$ and $SO_2$. These derivatives COS and $CS_2$ may already exist in the charge of acid gas containing $H_2S$ which is fed into the sulphur plant, and/or may be formed during the oxidation of the $H_2S$ to sulphur because of the presence of $CO_2$ and/or hydrocarbons in the acid gas.

The residual gas withdrawn from the sulphur plant is commonly treated in order to reduce its overall content of sulphur compounds to a minimum so that, after incineration, it can be discharged into the atmosphere in accordance with the standards imposed by pollution legislation, and at the same time so that these sulphur compounds are recovered in a form which helps to increase the yield of utilizable products obtained from the gas treated in the sulphur plant.

In various techniques developed for the treatment of a residual gas from a sulphur plant, said residual gas, at a temperature below 160° C., is fed into a purification unit, in which the compounds $H_2S$ and $SO_2$ present in the residual gas react with one another to form sulphur, said reaction being carried out at a temperature below the dew point of the sulphur formed, and at the outlet of which a purified residual gas is obtained which is discharged into the atmosphere after it has been incinerated.

In such purification techniques, practically nothing of the organic sulphur compounds COS and $CS_2$ is retained in the purification unit, and all or part of them ends up in the purified residual gas sent for incineration, which causes considerable sulphur losses and limits the sulphur yield of the complex comprising the sulphur plant and the purification unit to values of about 99%, the sulphur losses which result from the fact that the compounds COS and $CS_2$ pass through to the incineration stage representing a fraction of the sulphur yield of said complex which can vary from about 0.1 to 0.5%.

SUMMARY OF THE INVENTION

The invention covers a process which makes it possible to improve the sulphur yield of the above-mentioned complex by ensuring that virtually all of the compounds COS and $CS_2$ are recovered in the form of sulphur, which concomitantly also lowers the concentration of sulphur products discharged into the atmosphere and improves the quality of the discharges, which are free from COS and $CS_2$.

The process according to the invention for improving the sulphur yield of a complex for the production of sulphur from an acid gas containing $H_2S$, said complex comprising, on the one hand, a sulphur plant, into which said acid gas is introduced together with a controlled amount of a gas containing free oxygen, and in which a controlled oxidation of the $H_2S$ in the acid gas is carried out by means of the oxygen in the gas containing free oxygen in order to produce sulphur, and at the outlet of which a residual gas is withdrawn which contains water vapour and, in an overall amount of between 0.2 and 4% by volume, sulphur compounds including $H_2S$, $SO_2$ and at least one of the derivatives COS and $CS_2$, and, on the other hand, a purification unit, into which said residual gas is passed and in which the compounds $H_2S$ and $SO_2$ which it contains are reacted with one another to form sulphur, said reaction being carried out at a temperature below the dew point of the sulphur formed, and to give a purified residual gas at the outlet of said unit, is characterized in that the residual gas introduced into the purification unit is produced by bringing the residual gas coming from the sulphur plant into contact with a catalyst for hydrolyzing the compounds COS and $CS_2$ to $H_2S$, which operates at a sufficient temperature to produce a hydrolyzed residual gas containing $H_2S$ and $SO_2$ and is substantially free from COS and $CS_2$, and by bringing the hydrolyzed residual gas to the temperature required for it to pass into the purification unit, and in that the molar ratio $H_2S:SO_2$ in the hydrolyzed residual gas introduced into said purification unit is maintained at a value substantially equal to 2:1 by varying the ratio of the flow rates of acid gas and gas containing free oxygen which are introduced into the sulphur plant.

DESCRIPTION OF THE PREFERRED EMBODIMENTS

Advantageously, the temperature at which the hydrolysis reaction of the compounds COS and $CS_2$ is carried out is between 180° C. and 400° C., said temperature preferably being chosen in the range from 250° C. to 350° C.

The time for which the residual gas coming from the sulphur plant remains in contact with the hydrolysis catalyst can be between 0.5 and 10 seconds and can range from 1 to 5 seconds in particular, these values being given under standard pressure and temperature conditions.

The catalysts which can be used to promote the hydrolysis reaction can be selected from the various catalysts which are capable of performing this function without reacting with the components of the residual gas. It is possible, in particular, to use catalysts based on alumina, i.e. formed of a material containing at least 50% and advantageously at least 90% by weight of activated alumina, and especially catalysts consisting of activated aluminas selected from the activated aluminas used to promote the CLAUS reaction of $H_2S$ with $SO_2$ to give sulphur. The hydrolysis can also be carried out using catalysts resulting from the association of at least one compound of a metal selected from Fe, Ni, Co, Cu, Zn, Cr and Mo with an alumina and/or silica support, such as those described in French patent document A-2 327 960. The hydrolysis catalysts based on alumina advantageously have specific surface areas (measured by the nitrogen absorption method or so-called BET method) ranging from 100 m$^2$/g to 400 m$^2$/g and preferably from 150 m$^2$/g to 350 m$^2$/g, and total pore volumes (determined by the mercury penetration method) of between 0.1 and 1.2 cm$^3$/g and preferably of between 0.3 and 1 cm$^3$/g.

Other suitable hydrolysis catalysts are catalysts containing titanium oxide and in particular catalysts consisting of titanium oxide or those containing a mixture of titanium oxide and the sulphate of an alkaline earth metal selected from calcium, strontium, barium and magnesium, or alternatively those based on titanium oxide and a support such as alumina, silica or zeolite. In the catalysts based on titanium oxide and an alkaline earth metal sulphate, the ratio of the proportion by weight of titanium oxide, expressed as TiO$_2$, to the proportion by weight of alkaline earth metal sulphate in the calcined catalyst can range from 99:1 to 60:40 and preferably from about 99:1 to 80:20. The hydrolysis catalysts based on titanium oxide advantageously have specific surface areas (measured by the BET method) of between 5 and 300 m$^2$/g and preferably of between 10 and 250 m$^2$/g, and total pore volumes (determined by the mercury penetration method) of between 0.05 and 0.6 cm$^3$/g and preferably of between 0.1 and 0.4 cm$^3$/g. Catalysts containing titanium oxide can be obtained in the manner described in French patent document A-2 481 145. Catalysts containing titanium oxide and an alkaline earth metal sulphate can be obtained using one or other of the preparative techniques taught by European patent document A-0060741.

The hydrolyzed residual gas can advantageously be brought to the temperature required for it to pass into the purification unit by indirect heat exchange with a fluid at an appropriate temperature.

The molar ratio $H_2S:SO_2$ in the hydrolyzed residual gas fed into the purification unit can be maintained at a value of 2:1 by using the various methods of regulation known for maintaining the molar ratio $H_2S:SO_2$ in the residual gases from a sulphur plant at a value of 2:1 by varying the ratio of the flow rates of acid gas and gas containing free oxygen which are introduced into the sulphur plant, said variation advantageously being effected by keeping the flow rate of acid gas fed into the sulphur plant constant and varying the flow rate of gas containing free oxygen. In most of these methods of regulation, a sample of the residual gas is analyzed so as to determine the molar proportions of $H_2S$ and $SO_2$ therein and so as to produce, from said proportions, a parameter representative of the instantaneous value of the molar ratio $H_2S:SO_2$ in the residual gas, a parameter representative of the correct flow rate of the gas containing free oxygen for bringing said instantaneous value of the molar ratio $H_2S:SO_2$ to a value of 2:1 is then produced, and the parameter produced in this way is used to adjust the flow rate of the gas containing free oxygen which is introduced into the sulphur plant, this flow rate adjustment being made either to the whole of the flow of gas containing free oxygen or only to a small flow additional to a larger main flow proportional to the amount of $H_2S$ present in the acid gas. The technique employed in these methods of regulation for analyzing the sample of residual gas can be, for example, an analytical technique based on gas chromatography (U.S. Pat. No. 3 026 184 and French patent document A-2 118 365), an analytical technique based on ultraviolet absorption (THE OIL AND GAS JOURNAL, Aug. 10, 1970, pages 155 to 157) or an analytical technique based on interference spectrometry (French patent document A-2 420 754).

The gas containing free oxygen which is introduced into the sulphur plant to effect controlled oxidation of the $H_2S$ in the acid gas is generally air, although it is possible to use pure oxygen or oxygen- enriched air or even mixtures, in various proportions, of oxygen and one or more inert gases other than nitrogen.

In the process according to the invention, "sulphur plant" denotes any installation into which the acid gas containing $H_2S$ is introduced together with a controlled amount of a gas containing free oxygen, and in which controlled oxidation of the $H_2S$ in the acid gas is carried out by means of the oxygen in the gas containing free oxygen in order to produce sulphur, and at the outlet of which a residual gas having the characteristics defined above is also withdrawn. In particular, the sulphur plant can be a CLAUS sulphur plant, in which a fraction of the $H_2S$ in the acid gas is subjected to combustion in a combustion zone, operating at elevated temperature, in order to produce a gaseous effluent containing $H_2S$ and $SO_2$ and possibly elemental sulphur, and in which, after the sulphur which it may contain has been condensed out, said gaseous effluent is brought into contact with a CLAUS catalyst, situated in one or more catalytic oxidation zones operating at temperatures above the dew point of the sulphur contained in the effluent, in order to form a further amount of sulphur by the reaction of $H_2S$ with $SO_2$, said sulphur being condensed out after each catalytic step. In such a CLAUS sulphur plant, the partial combustion of the $H_2S$ in the acid gas in order to form the effluent containing $H_2S$ and $SO_2$ is carried out at temperatures of between 900° C. and 1600° C. and the reaction of $H_2S$ with $SO_2$ in contact with the CLAUS catalyst operating at temperatures above the dew point of the sulphur contained in the reaction medium is carried out at temperatures of between 180° C. and 450° C. in at least one catalytic zone and preferably in several catalytic zones arranged in series. In the latter case, the operating temperatures of the different catalytic zones decrease from one catalytic zone to the next. After each reaction phase, the sulphur produced, contained in the reaction medium, is condensed out and the substantially sulphur-free reaction medium is heated to the temperature chosen for the subsequent reaction phase. The temperature of the residual gas coming from the sulphur plant corresponds essentially to the temperature to which the reaction medium produced in the last reaction phase in the sulphur plant has been cooled in order to condense out the sulphur which it contains, said temperature generally being between 120° C. and 160° C.

The purification unit in which the hydrolyzed residual gas is treated can consist of any installation which makes it possible to produce sulphur by reacting $H_2S$ with $SO_2$ at a temperature below the dew point of the sulphur formed, and to obtain a purified residual gas substantially free from sulphur compounds such as $SO_2$ and $H_2S$. In particular, the purification unit can be a catalytic purification unit in which the hydrolyzed residual gas, at a temperature below 160° C., is brought into contact with a CLAUS catalyst in order to form sulphur by the reaction of $H_2S$ with $SO_2$, said contact taking place at a sufficiently low temperature for the sulphur formed to deposit on the catalyst, the sulphur-charged catalyst being periodically regenerated by sweeping with a non-oxidizing gas at between 200° C. and 500° C. in order to vaporize the sulphur which it retains, and then cooled with an inert gas, at a temperature below 160° C., until it reaches the temperature required for it to be brought into contact with the residual gas again. Examples of catalytic purification units operating in the manner indicated above are described especially in French patent documents A-2 180 473 and A-2 224 196.

The temperature at which the sulphur formation reaction of $H_2S$ with $SO_2$ is carried out in the purification unit, which must be below the dew point of the sulphur formed, is generally below 180° C. and advantageously between 100° C. and 160° C.

Before being discharged into the atmosphere, the purified residual gas leaving the purification unit is generally subjected to thermal or catalytic incineration so that all the sulphur compounds which it may still contain in very small overall amounts are converted to $SO_2$. The hydrolysis according to the invention of the compounds COS and $CS_2$ upstream from the purification unit facilitates the thermal or catalytic incineration of the purified residual gas coming from said unit. In fact, as said purified gas no longer contains either COS or $CS_2$, it can be incinerated at lower temperatures, thereby reducing the amount of fuel gas required for this incineration.

The catalyst used in the CLAUS sulphur plant and the catalyst employed in the catalytic purification unit requiring a CLAUS catalyst can be selected from products such as bauxite, alumina, silica and natural or synthetic zeolites, which are commonly used to promote the sulphur formation reaction of $H_2S$ with $SO_2$.

BRIEF DESCRIPTION OF THE FIGURE

The invention will be understood more clearly from the following description of one of its embodiments using the installation shown in the Figure of the attached drawing.

This installation comprises, connected in series, a CLAUS sulphur plant 1, a hydrolysis reactor 2, a catalytic purification unit 3 and an incinerator 4 joined to a chimney 5.

The sulphur plant 1 comprises, on the one hand, a combustion chamber 6, which has a burner 7 provided with an acid gas feed duct 8 and an air feed duct 9, the latter duct being equipped with an adjustable valve 10, and which has an outlet 6a for the gases, and, on the other hand, a first catalytic converter 11 and a second catalytic converter 12, which each have an inlet, 11a and 12a respectively, and an outlet, 11b and 12b respectively, separated by a fixed bed of a CLAUS catalyst. The combustion chamber 6 and the catalytic converters 11 and 12 are connected in series so that the outlet 6a of the combustion chamber is joined to the inlet 11a of the first converter 11 via a first sulphur condenser 13 and then a first heater 14, so that the outlet 11b of said first converter is joined to the inlet 12a of the second converter 12 via a second sulphur condenser 15 and then a second heater 16, and so that the outlet 12b of said second converter is connected to the inlet 17a of a third sulphur condenser 17 possessing an outlet 17b for the gases, which forms the outlet of the sulphur plant.

The catalytic purification unit 3 comprises two catalytic reactors 18 and 19 connected in parallel, which each possess, on the one hand, an inlet duct for the gas to be purified, 20 and 21 respectively, said inlet duct being provided with a valve, 20a and 21a respectively, and an injection duct, 22 and 23 respectively, for a regenerating and cooling gas, said injection duct being provided with a valve, 22a and 23a respectively, and, on the other hand, an outlet duct for the purified gas, 24 and 25 respectively, said outlet duct being provided with a valve, 24a and 25a respectively, and a discharge duct, 26 and 27 respectively, for a regenerating and cooling effluent, said discharge duct being provided with a valve, 26a and 27a respectively. The inlet ducts, 20 and 21 respectively, of the catalytic reactors 18 and 19 are connected, via the corresponding valves 20a and 21a, to a duct 28 forming the inlet of the catalytic purification unit 3. Likewise, the outlet ducts, 24 and 25 respectively, of said catalytic reactors 18 and 19 are connected, via the corresponding valves 24a and 25a, to a duct 29 forming the outlet of the catalytic purification unit 3. In each of the catalytic reactors 18 and 19, the orifices of the inlet and injection ducts are separated from the orifices of the outlet and discharge ducts by a fixed bed of a CLAUS catalyst. The injection ducts 22 and 23 of the reactors 18 and 19 are connected in parallel, via the corresponding valves 22a and 23a, to one of the ends 30a of a duct 30 for circulating a regenerating and cooling gas, and the discharge ducts 26 and 27 of said reactors are also connected in parallel to the other end 30b of said duct 30. Inserted in this duct 30, from its end 30b to its end 30a, are a sulphur condenser 31, a blower 32, a valve 33, a heater 34 and a bypass 35 provided with a valve 35a, one of the ends of said bypass coming out into the duct 30 between the blower 32 and the valve 33 and the other end coming out downstream from the heater 34. The blower 32 is inserted in the circuit 30 so that its suction orifice is joined to the sulphur condenser 31. The duct 29 forming the outlet of the purification unit 3 is connected by a duct 45 to the incinerator 4, which is itself joined by a duct 46 to the chimney 5. In addition, a first pipe (not shown) joins the duct 38, feeding the hydrolyzed and cooled residual gas into the purification unit, to the circuit 30 at a point on the latter which is between the condenser 31 and the blower 32, and a second pipe (also not shown) connects said duct 38, downstream from the point where this duct 38 joins the first pipe, to the duct 30 at a point on the latter which is between the blower 32 and the valve 33.

The hydrolysis reactor 2 has an inlet 2a and an outlet 2b separated from one another by a fixed bed of a hydrolysis catalyst. The outlet 17b of the sulphur plant 1 is connected by a duct 36, via a heater 37 of the indirect heat exchanger type, to the inlet 2a of the hydrolysis reactor, and the outlet 2b of said reactor is connected by a duct 38, via a cooling system 39 of the indirect heat exchanger type, to the duct 28 forming the inlet of the purification unit.

An analyzer 40, for example of the interference spectrometer type, branches off from the duct 38 downstream from the cooling system 39, said analyzer being set up to determine the molar proportions of $H_2S$ and $SO_2$ in the gas circulating in the duct 38 and to provide a signal 41 representative of the instantaneous value of the molar ratio $H_2S:SO_2$ in said gas. The signal 41 is fed into a calculator 42, which produces a signal 43 representative of the correct air flow rate for bringing the instantaneous value of the molar ratio $H_2S:SO_2$ to a desired value, said signal 43 being applied to a flow regulator 44, which adjusts the valve 10 and thereby adjusts the flow rate of air introduced into the sulphur plant through the duct 9. The process cycle in this installation can be represented schematically in the following way. The reactor 18 is assumed to be in the reaction phase and the reactor 19 in the regeneration phase, the valves 20a, 24a, 23a, 27a and 33 being open and the valves 21a, 22a, 25a, 26a and 35a being closed.

In the sulphur plant 1, the acid gas containing $H_2S$, which is introduced through the duct 8 into the burner 7 of the combustion chamber 6, undergoes partial combustion to form a gaseous effluent containing $H_2S$ and $SO_2$ and elemental sulphur. After the sulphur which it contains has been separated out in the first sulphur condenser 13, this effluent is heated in the first heater 14 and passes into the first converter 11. On contact with the CLAUS catalyst contained in this converter, the compounds $H_2S$ and $SO_2$ present in the gaseous effluent react to form sulphur. After the sulphur which it contains has been separated out in the second condenser 15 and after it has then been heated in the second heater 16, the reaction mixture coming from the converter 11 passes into the second converter 12, where a further amount of sulphur is formed by the catalytic reaction of $H_2S$ with $SO_2$. The sulphur contained in the reaction mixture coming from the converter 12 is removed in the third condenser 17. At the outlet 17b for the gases from said condenser, which forms the outlet of the sulphur plant, a residual gas is withdrawn which contains water vapour and, in an overall amount of less than 4% by volume, sulphur compounds including $H_2S$, $SO_2$, COS and/or $CS_2$, together with a very small amount of sulphur vapour and/or vesicular sulphur.

After it has been heated to the appropriate temperature in the heater 37, the residual gas coming from the sulphur plant passes into the hydrolysis reactor 2, in which the compounds COS and $CS_2$ present in said residual gas are hydrolyzed to $H_2S$ in contact with the catalyst contained in said reactor 2. At the outlet 2b of the hydrolysis reactor, a hydrolyzed residual gas is withdrawn which contains $H_2S$ and $SO_2$ and is substantially free from COS and $CS_2$. After it has been cooled to the appropriate temperature in the cooling system 39, the hydrolyzed residual gas is introduced through the duct 38 into the duct 28 of the catalytic purification unit, which forms the inlet of said unit.

The hydrolyzed residual gas passing through the duct 28 is introduced into the catalytic reactor 18, in which the compounds $H_2S$ and $SO_2$ contained in said residual gas react with one another to form sulphur. The temperature of the gas stream brought into contact with the CLAUS catalyst contained in the reactor 18 is such that the sulphur formed deposits on the catalyst. A purified residual gas with an extremely low content of sulphur compounds leaves the reactor 18 through the duct 24 and is directed into the incinerator 4 via the valve 24a, the duct 29 and the duct 45, the incinerated gas being led to the chimney 5 through the duct 46 and discharged into the atmosphere.

A stream of sweep gas, conveyed through the regeneration circuit 30 under the action of the blower 32, is heated in the heater 34 to the temperature required for regeneration of the CLAUS catalyst on which the sulphur is deposited. The stream of heated gas is introduced into the reactor 19 through the duct 23, via the valve 23a, and sweeps the sulphur-charged CLAUS catalyst contained in said reactor. The stream of sweep gas carrying the vaporized sulphur leaves the reactor 19 through the duct 27 and flows, via the valve 27a and the duct 30, into the sulphur condenser 31, in which the bulk of the sulphur condenses out. At the outlet of the condenser 31, the stream of sweep gas is taken up by the blower 32 and delivered to the inlet of the reactor 19 via the heater 34. After the catalyst contained in the reactor 19 has been swept by the hot sweep gas coming from the heater 34 for a sufficient time to remove all the sulphur deposited on the catalyst and thus to regenerate said catalyst, the valve 35a is opened and the valve 33 is closed so as to short-circuit the heater 34 and lower the temperature of the sweep gas to a value below about 160° C., and sweeping is continued for a sufficient time to cool the regenerated catalyst contained in the reactor 19. When said catalyst has been cooled to a temperature suitable for bringing the catalyst into contact with the gas stream coming from the hydrolysis reactor 2, the roles of the reactors 18 and 19 are reversed, i.e. the reactor 19 is switched to the CLAUS reaction phase and the reactor 18 to the regeneration/cooling phase. This is done by closing the valves 20a, 23a, 24a, 27a and 35a and opening the valves 21a, 22a, 25a, 26a and 33 and then, at the cooling stage, closing the valve 33 and opening the valve 35a. During the transitional period in which the roles of the reactors 18 and 19 are reversed, the sweep gas is circulated in a duct (not shown) which bypasses said reactors. The sweep gas circulating in the circuit 30 is taken, via the first pipe, from the hydrolyzed and cooled residual gas fed into the catalytic purification unit through the duct 38. The second pipe enables the circuit 30 to be purged as required.

The analyzer 40 of the regulation system consisting of said analyzer, the calculator 42 and the flow regulator 44 continuously determines the molar proportions of $H_2S$ and $SO_2$ in the hydrolyzed residual gas passing through the duct 38 downstream from the cooling system 39 following the hydrolysis reactor 2, and delivers a signal 41 representative of the instantaneous value of the molar ratio $H_2S:SO_2$ in said residual gas. From the signal 41, the calculator 42 produces a signal 43 representative of the correct flow rate of the air injected into the sulphur plant for bringing the instantaneous value of the molar ratio $H_2S:SO_2$ in the residual gas entering the catalytic purification unit 3 to the desired value of 2:1. In response to the signal 43 which it receives from the calculator 42, the regulator 44 adjusts the valve 10 inserted in the duct 9 for feeding air into the sulphur plant 1, and thus varies the flow rate of air introduced into said sulphur plant by an amount which enables the molar ratio $H_2S:SO_2$ in the residual gas fed into the catalytic purification unit 3 to be maintained at the desired value.

To complement the description which has now been given of the process according to the invention, an Example of how said process is carried out is given below without implying a limitation.

EXAMPLE

Using an installation analogous to that which is represented schematically in the Figure of the attached drawing and operates as described above, sulphur was produced from an acid gas containing, by volume, 70.1% of $H_2S$, 5% of $H_2O$, 24.4% of $CO_2$, 0.3% of $CH_4$ and 0.2% of linear $C_6$–$C_7$ alkanes.

The catalyst placed in the hydrolysis reactor 2 consisted of extrudates, 4 mm in diameter, of titanium oxide containing 10% by weight of calcium sulphate. The CLAUS catalyst present in the catalytic converters 11 and 12 of the sulphur plant 1 and in the reactors 18 and 19 of the catalytic purification unit 3 was formed of beads, from 2 to 5 mm in diameter, of an alumina having a specific surface area of about 240 m²/g. In the sulphur plant 1, the combustion chamber 6 and the catalytic converters 11 and 12 operated at temperatures of about 1100° C., 300° C. and 250° C. respectively.

At the outlet 17b of the sulphur plant, a residual gas was withdrawn at a temperature of 142° C. and an absolute pressure of 1.15 bar. This residual gas had the following composition in percentages by volume, excluding sulphur vapour and vesicular sulphur.

| | |
|---|---|
| $N_2$: | 54.84 |
| $H_2O$: | 30.54 |
| $H_2$: | 2.26 |
| CO: | 0.97 |
| $CO_2$: | 10.08 |
| $H_2S$: | 0.74 |
| $SO_2$: | 0.45 |
| COS: | 0.08 |
| $CS_2$: | 0.04 |

The sulphur recovery yield of the sulphur plant 1 was 95.1%.

The residual gas withdrawn from the sulphur plant was heated to 300° C. in the heater 37 and then entered the hydrolysis reactor 2 operating at the same temperature. The time for which the residual gas remained in contact with the catalyst contained in the hydrolysis reactor was 3 seconds under normal pressure and temperature conditions.

The hydrolyzed residual gas leaving the reactor 2 now contained only traces of COS and $CS_2$, the degree of hydrolysis of said compounds being greater than 99%. The hydrolyzed residual gas was cooled to 132° C. by passage through the cooling system 39 and was then injected, at this temperature and with its molar ratio $H_2S$:$SO_2$ maintained at a value of 2:1 by the regulation system, into that catalytic reactor 18 or 19 of the catalytic purification unit 3 which was operating in the CLAUS reaction phase. Through the duct 29 connected to the outlet of said reactor and forming the outlet of the catalytic purification unit 3, a purified residual gas at a temperature of about 145° C. was withdrawn which had an overall content of sulphur products of 1200 ppm by volume, said purified gas being led into the incinerator 4 through the duct 45. Incineration took place at 450° C. by the combustion of a fuel gas with a slight excess of air, resulting in 1% by volume of oxygen in the incinerated gas sent to the chimney.

The sweep gas used to regenerate the sulphur-charged catalyst contained in the reactor in the regeneration phase, and then to cool it, consisted of part of the hydrolyzed and cooled residual gas taken from the duct 38 via the first pipe, and was introduced into the reactor in the regeneration phase after it had been brought to a temperature of between 300° C. and 350° C. in the heater 34 of the regeneration circuit. The sulphur-charged sweep gas coming from the reactor in the regeneration phase then passed into the sulphur condenser 31 of the regeneration circuit, where it was cooled to about 125° C. so as to condense out the bulk of the sulphur which it contained, and then returned to the heater 34 to be re-used for regeneration. The sweep gas coming from the condenser 31 and circulating in the bypass 35 short-circuiting the heater 34 was then passed through the reactor containing the regenerated catalyst in order to cool it to a temperature of about 130° C.

The catalytic reactors 18 and 19 operated alternately for 30 hours in the purification phase, i.e. the reaction phase, and for 30 hours in the regeneration/cooling phase, including 10 hours for cooling. The sulphur yield of the complex comprising the sulphur plant, the hydrolysis step according to the invention and the catalytic purification unit was 99.6%. Under comparable operating conditions, the sulphur yield of the complex comprising only the sulphur plant and the catalytic purification unit was 99.1%.

We claim:

1. A process for improving the sulphur yield of a complex for the production of sulphur from an acid gas containing $H_2S$, said complex comprising, (i) a sulphur plant into which said acid gas is introduced together with a controlled amount of a gas containing free oxygen and in which a controlled oxidation of the $H_2S$ in the acid gas is carried out by means of the oxygen in the gas containing free oxygen in order to produce sulphur and which comprises at least one catalytic Claus zone, and at the outlet of which a residual gas is withdrawn which contains water vapour and, in an overall amount of between 0.2 and 4% by volume, sulphur compounds selected from the groups consisting of $H_2S$, $SO_2$ and at least one of the derivatives COS and $CS_2$, and, (ii) a purification unit, into which the residual gas is passed in which the compounds $H_2S$ and $SO_2$ which it contains are reacted with one another to form sulphur, said reaction being carried out at a temperature below the dew point of the sulphur formed, and to give a purified residual gas at the outlet of said unit, said process comprising the steps of a) contacting the residual gas issuing from the sulphur plant with a catalyst hydrolyzing the compounds COS and $CS_2$, said catalyst being situated in a hydrolyzing zone outside the sulphur plant and operating at a sufficient temperature to produce a hydrolyzed residual gas containing $H_2S$ and $SO_2$ and substantially free from COS and $CS_2$, b) bringing the hydrolyzed residual gas to the temperature required for it to pass into the purification unit and then directing said hydrolyzed residual gas to said purification unit as the residual gas to be introduced into this unit, and c) maintaining the $H_2S$ to $SO_2$ molar ratio in the hydrolyzed residual gas introduced into the purification unit at a value substantially equal to 2:1 by varying the ratio of the flow rates of acid gas and gas containing free oxygen which are introduced into the sulphur plant.

2. A process according to claim 1, wherein the temperature at which the residual gas coming from the sulphur plant is brought into contact with the hydrolysis catalyst is between 180° C. and 400° C.

3. A process according to claim 1, wherein the time for which the residual gas coming from the sulphur plant remains in contact with the hydrolysis catalyst, expressed under standard pressure and temperature conditions, is between 0.5 and 10 seconds.

4. A process according to claim 1 wherein the hydrolysis catalyst contains at least 50% by weight about of activated alumina.

5. A process according to claim 4, wherein the hydrolysis catalyst is an activated alumina.

6. A process according to claim 4, wherein the hydrolysis catalyst based on alumina has a specific surface area, determined by the BET method, ranging from 100 $m^2/g$ to 400 $m^2/g$ and a total pore volume determined by the mercury penetration method, of between 0.1 and 1.2 $cm^3/g$.

7. A process according to claim 1, wherein the hydrolysis catalyst results from the association of at least one compound of a metal selected from Fe, Ni, Co, Cu, Zn, Cr and Mo with an alumina and/or silica support.

8. A process according to claim 1, wherein the hydrolysis catalyst contains titanium oxide.

9. A process according to claim 1, wherein the hydrolysis catalyst contains titanium oxide and the sulphate of an alkaline earth metal selected from Ca, Sr, Ba and Mg.

10. A process according to claim 9, wherein the ratio of the proportion by weight of titanium oxide, expressed as $TiO_2$, to the proportion by weight of alkaline earth metal sulphate in the catalyst ranges from 99:1 to 60:40.

11. A process according to claim 8, wherein the hydrolysis catalyst containing titanium oxide has a specific surface area, measured by the BET method, of between 5 $m^2/g$ and 300 $m^2/g$, and a total pore volume, determined by the mercury penetration method, of between 0.05 and 0.6 $cm^3/g$.

12. A process according to claim 1, wherein the molar ratio $H_2S:SO_2$ in the hydrolyzed and cooled residual gas introduced into the purification unit is maintained at a value of 2:1 by keeping the flow rate of acid gas introduced into the sulphur plant constant and varying the flow rate of gas containing free oxygen which is introduced into said sulphur plant.

13. A process according to claim 12, wherein said molar ratio $H_2S:SO_2$ is maintained at a value of 2:1 by analyzing the hydrolyzed and cooled residual gas introduced into the purification unit so as to determine the molar proportions of $H_2S$ and $SO_2$ therein, and by producing, from said proportions, a parameter representative of the instantaneous value of said molar ratio $H_2S:SO_2$, and then by producing a parameter representative of the correct flow rate of the gas containing free oxygen for bringing said instantaneous value to a value of 2:1, and using the parameter produced in this way to adjust the flow rate of the gas containing free oxygen which is introduced into the sulphur plant, this flow rate adjustment being made either to the whole of the flow of gas containing free oxygen or only to a small flow additional to a larger main flow proportional to the amount of $H_2S$ present in the acid gas.

14. A process according to claim 1, wherein the temperature at which the residual gas coming from the sulphur plant is brought into contact with the hydrolysis catalyst is between 250° C. and 350° C.

15. A process according to claim 1 wherein the time for which the residual gas coming from the sulphur plant remains in contact with the hydrolysis catalyst, expressed under standard pressure and temperature conditions, is between 1 to 5 seconds.

16. A process according to claim 1 wherein the hydrolysis catalyst contains at least 90% by weight of activated alumina.

17. A process according to claim 4 wherein the hydrolysis catalyst based on alumina has a specific surface area, determined by the BET method, ranging from 150 $m^2/g$ to 350 $m^2/g$, and a total pore volume determined by the mercury penetration method, of between 0.3 and 1 $cm^3/g$.

18. A process according to claim 9, wherein the ratio of the proportion by weight of titanium oxide, expressed as $TiO_2$, to the proportion by weight of alkaline earth metal sulphate in the catalyst ranges from 99:1 to 80:20.

19. A process according to claim 8, wherein the hydrolysis catalyst containing titanium oxide has a specific surface area, measured by the BET method, of between 10 $m^2/g$ and 240 $m^2/g$, and a total pore volume, determined by the mercury penetration method, of between 0.1 and 0.4 $cm^3/g$.

20. A process according to claim 1, wherein the residual gas coming from the sulphur plant is brought into contact with the hydrolysis catalyst which contains at least 90% by weight of activated alumina, at a temperature between 250° C. and 350° C., and wherein the time for which the residual gas coming from the sulphur plant remains in contact with the hydrolysis catalyst, expressed under standard pressure and temperature conditions, is between 1 to 5 seconds.

21. A process for improving the sulphur yield of a complex for the production of sulphur from an acid gas containing $H_2S$, said complex consisting essentially of
(i) a Claus sulphur plant, into which said acid gas is introduced together with a controlled amount of a gas containing free oxygen, a fraction of the $H_2S$ in the acid gas is combusted at a temperature in a combustion sufficient zone to produce a gaseous effluent containing $H_2S$, $SO_2$ and possibly elemental sulphur and after condensation of the sulphur it may contain said gaseous effluent which is contacted with a Claus catalyst situated in one or more catalytic zones placed in a series with the combustion zone and operating at a temperature above the dew point of the sulphur contained in said effluent, and at the outlet of which a residual gas is withdrawn which contains water vapour and, in an overall amount of between 0.2 and 4% by volume, sulphur compounds selected from the group consisting of $H_2S$, $SO_2$ and at least one of the compounds COS and $CS_2$, and
  (ii) a purification unit, into which the residual gas is passed and in which the compounds $H_2S$ and $SO_2$ which it contains are reacted with one another to form sulphur, said reaction being carried out at a temperature below the dew point of the sulphur formed, and to give a purified residual gas at the outlet of said unit, said process comprising the steps of:
    a) contacting the residual gas issuing from the sulphur plant with a catalyst hydrolyzing the compounds COS and $CS_2$, said catalyst being situated in a hydrolyzing zone outside the sulphur plant and continuously operating at a sufficient temperature to produce a hydrolyzed residual gas containing $H_2S$ and $SO_2$ and substantially free from COS and $CS_2$, b) bringing the hydrolyzed residual gas to the temperature required for it to pass into the purification unit and then directing said hydrolyzed residual gas to said purification unit as the residual gas to be introduced into this unit, and c) maintaining the $H_2S$ to $SO_2$ molar ratio in the hydrolyzed residual gas introduced into the purification unit at a value substantially equal to 2:1 by varying the ratio of the flow rates of acid gas and gas containing free oxygen which are introduced into the sulphur plant.

* * * * *